United States Patent
Kondru

(10) Patent No.: US 12,067,374 B2
(45) Date of Patent: Aug. 20, 2024

(54) DIVISION AND MODULO OPERATIONS

(71) Applicant: Texas Instruments Incorporated, Dallas, TX (US)

(72) Inventor: Dinakar Kondru, Frisco, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 17/553,081

(22) Filed: Dec. 16, 2021

(65) Prior Publication Data

US 2023/0195418 A1  Jun. 22, 2023

(51) Int. Cl.
*G06F 7/535* (2006.01)
*G06F 7/72* (2006.01)

(52) U.S. Cl.
CPC .............. *G06F 7/535* (2013.01); *G06F 7/727* (2013.01)

(58) Field of Classification Search
CPC ........................... G06F 7/535; G06F 7/72–727
See application file for complete search history.

(56) References Cited

U.S. PATENT DOCUMENTS

| | | | |
|---|---|---|---|
| 5,007,009 A * | 4/1991 | Azetsu | G06F 7/535 708/653 |
| 6,173,305 B1 | 1/2001 | Poland | |
| 10,628,126 B2 | 4/2020 | Tessarolo et al. | |
| 11,416,405 B1 * | 8/2022 | Ma | G06F 12/0891 |
| 2012/0166512 A1 * | 6/2012 | Wong | G06F 7/535 708/650 |

* cited by examiner

*Primary Examiner* — Emily E Larocque
(74) *Attorney, Agent, or Firm* — Brian D. Graham; Frank D. Cimino

(57) ABSTRACT

A device is provided. In some examples, the device includes a division logic circuit having input lines including a first least significant input line. The division logic circuit further includes temporary output lines including a second least significant line. The device also includes a first multiplexer having a first data input coupled to the first least significant input line. The first multiplexer further includes a second data input coupled to the second least significant line.

20 Claims, 5 Drawing Sheets

DIVISION AND MODULO OPERATIONS

BACKGROUND

A divide-by-N circuit outputs digital number (i.e., a quotient) based on a first digital number (i.e., a dividend) received by the divide-by-N circuit. The quotient outputted by the divide-by-N circuit is equal to the dividend divided by a constant divisor N. A modulo-N circuit receives a dividend and outputs a digital number representing the remainder when the dividend is divided by the constant divisor N. For example, the decimal number seventeen (the dividend) divided by three (the divisor) is equal to five (the quotient) with a remainder of two.

In some applications, a set of input numbers may be processed by the divide-by-N circuit and the modulo-N circuit. One such application is a processor that interleaves an address space across an odd number (N) of external memory interfaces (EMIFs). A modulo-N operation can be performed on an incoming address to select one of the EMIFs. A divide-by-N operation can be performed on the incoming address to determine the address number to send to the selected EMIF. The processor can send the address number to the selected EMIF as part of a memory access request (e.g., a read operation or a write operation).

Each number in the set of input numbers may be a power-of-two multiple or a power-of-two fraction of every other number in the set. Such a set of numbers may occur in a multi-granule memory application, where each granule size is a power-of-two multiple of the smallest granule size. The quantity of numbers in the set is equal to the number of granules supported in the memory application.

SUMMARY

In some examples, a device includes a division logic circuit having input lines including a first least significant input line. The division logic circuit further includes temporary output lines including a second least significant line. The device also includes a first multiplexer having a first data input coupled to the first least significant input line. The first multiplexer further includes a second data input coupled to the second least significant line.

In further examples, a device includes a first multiplexer having a first data input, a second data input, and an output. In addition, the device includes a modulo logic circuit having an input coupled to the output of the first multiplexer, where the modulo logic circuit further includes an output. The device also includes a rotation circuit including an input coupled to the output of the modulo logic circuit, where the rotation circuit further includes an output. The device further includes a second multiplexer having a first data input coupled to the output of the modulo logic circuit. The second multiplexer also includes a second data input coupled to the output of the rotation circuit.

In yet further examples, a device includes a division logic circuit having an input and an output. In addition, the device includes a plurality of bit-shifting circuits coupled to the output of the division logic circuit. The device also includes a modulo logic circuit having an input coupled to the input of the division logic circuit, where the modulo logic circuit further includes an output. The device further includes a rotation circuit having an input coupled to the output of the modulo logic circuit, where the rotation circuit further includes an output. The device includes a first multiplexer having a first data input coupled to the output of the modulo logic circuit. The first multiplexer further includes a second data input coupled to the output of the rotation circuit.

BRIEF DESCRIPTION OF THE DRAWINGS

Features of the present invention may be understood from the following detailed description and the accompanying drawings. In that regard.

DETAILED DESCRIPTION

Specific examples are described below in detail with reference to the accompanying figures. It is understood that these examples are not intended to be limiting, and unless otherwise noted, no feature is required for any particular example. Moreover, the formation of a first feature over or on a second feature in the description that follows may include examples in which the first and second features are formed in direct contact and examples in which additional features are formed between the first and second features, such that the first and second features are not in direct contact.

This disclosure describes performing a division operation and/or a modulo operation on a set of input numbers. A device implementing the techniques of this disclosure may include a single division logic circuit and/or a single modulo logic circuit capable of generating a result for any or all numbers in a set. A device implementing these techniques may have a smaller area and/or a shorter latency, as compared to devices implementing existing techniques. Of course, these advantages are merely examples, and no advantage is required for any particular embodiment.

Figure 1:
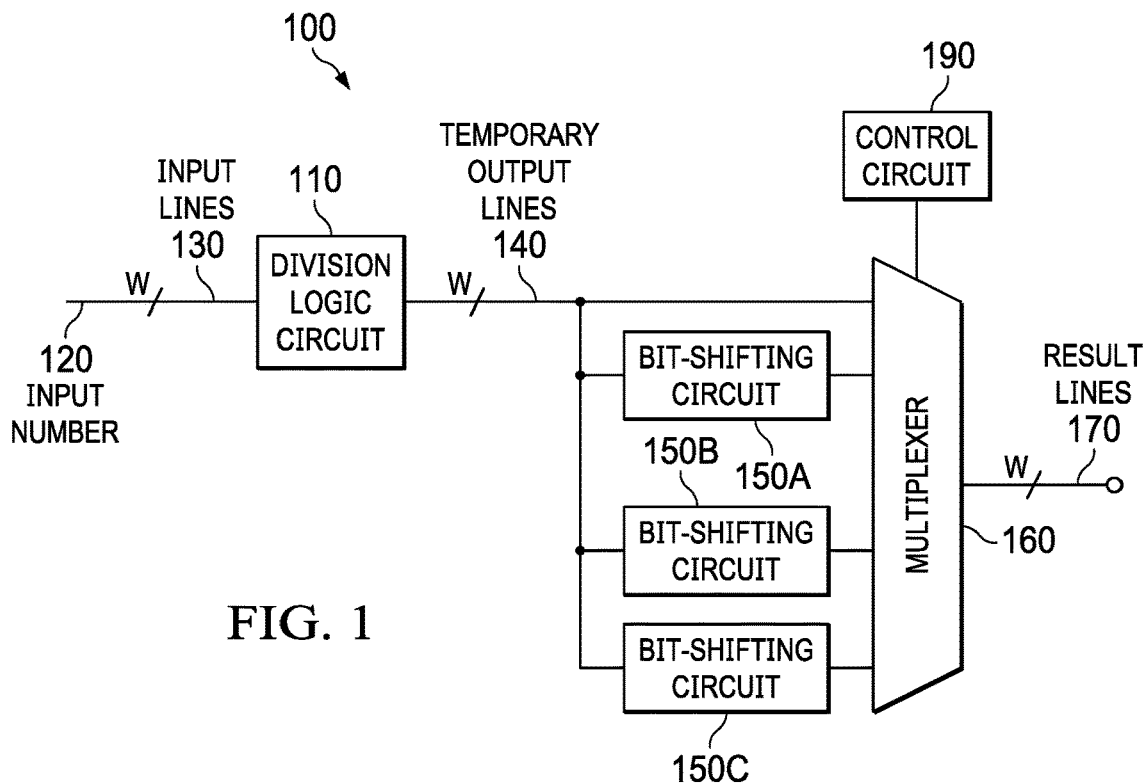
FIGS. 1, 2, and 5 are conceptual block and circuit diagrams of a device including a division logic circuit according to some aspects of the present disclosure.

Examples of division operations and modulo operations are described with reference to the figures below. In that regard, FIG. 1 is a conceptual block and circuit diagram of a device 100 including a division logic circuit 110 according to some aspects of the present disclosure. In the example shown in FIG. 1, device 100 includes division logic circuit 110, input lines 130, temporary output lines 140, bit-shifting circuits 150A-150C, multiplexer 160, result lines 170, and control circuit 190. As shown, device 100 is configured to compute a quotient for a number received by division logic circuit 110 via input lines 130.

Division logic circuit 110 includes an input coupled to input lines 130 and an output coupled to temporary output lines 140. Input lines 130 can carry the electrical signals representing input number 120, which are shown in FIG. 1 as W-bit numbers. Input lines 130 may include parallel lines configured to carry W separate signals, where each signal represents one bit of input number 120. Input number 120 may be the largest number in a set of numbers to be processed. Input number 120 may be a power-of-two multiple of every other number to be processed. For example, an interleaver in a multi-granule memory application may have access to the largest input number without a sorting circuit.

The set of numbers to be processed may be a set of addresses that is directly or indirectly provided to division logic circuit 110. The numbers may be provided indirectly in that division logic circuit 110 receives only one address (e.g., input number 120), where that one address is the largest possible one. The need to deal with a set of addresses (Sa) arises from multiple granules (Sk), which is a set:

Input number 120 (A1) is given (e.g., to the input of division logic circuit 110).

Sk={k1, k2, k3, . . . } is given (e.g., to control circuit 190).

Sa={A1, A2, A3, . . . } can be calculated by using Ak=A*2^k, where k is negative because A1 is the largest possible address.

Division logic circuit 110 may be configured to perform division based on a constant divisor number, such as a divide-by-three operation or a divide-by-five operation. Division logic circuit 110 may be configured to use input number 120 received via input lines as a dividend in the division operation. Division logic circuit 110 may be configured to output a quotient of the division operation on temporary output lines 140. Additional example details of division logic can be found in commonly assigned U.S. Pat. No. 6,173,305, entitled "Division by Iteration Employing Subtraction and Conditional Source Selection of a Prior Difference or a Left Shifted Remainder," issued on Jan. 9, 2001, which is incorporated by reference in its entirety.

Temporary output lines 140 can carry the electrical signals representing a quotient of the division performed by division logic circuit 110. Although FIG. 1 depicts temporary output lines 140 as having the same number (VV) of parallel lines as input lines 130, temporary output lines 140 may include fewer or more lines than input lines 130. Depending on the divisor used by division logic circuit 110, one or more of the most significant lines of temporary output lines 140 may be hardwired to logical zero.

Bit-shifting circuits 150A-150C may be configured to perform a division operation by shifting the bits on temporary output lines 140 to the right. Each of bit-shifting circuits 150A-150C includes an input coupled to the output of division logic circuit 110 via temporary output lines 140. In addition, each of bit-shifting circuits 150A-150C includes an output coupled to a respective data input of multiplexer 160. Each of bit-shifting circuits 150A-150C may include wires and/or other conductive elements to route each of temporary output lines 140 to a respective one of result lines 170. Bit-shifting circuits 150A-150C may be configured to discard one or more of the least significant bits on temporary output lines 140. For example, to shift a number on temporary output lines 140 by three bits to the right, bit-shifting circuit 150C may be configured to not route the three least significant bits of that number to the data input of multiplexer 160. Bit-shifting circuits 150A-150C may be simple circuits relative to other devices that have more than one division logic circuit because bit-shifting circuits 150A-150C may include only wires without any memory cells.

Temporary output lines 140 carry the quotient generated by division logic circuit 110 to a first data input of multiplexer 160. The number generated by bit-shifting circuit 150A may be one-half of the number on temporary output lines 140, the number generated by bit-shifting circuit 150B may be one-fourth of the number on temporary output lines 140, and the number generated by bit-shifting circuit 150C may be one-eighth of the number on temporary output lines 140. As shown in FIG. 1, multiplexer 160 includes four data inputs for receiving four quotients from circuits 110 and 150A-150C, but in other examples multiplexer 160 may have more or fewer data inputs.

Multiplexer 160 includes a first data input coupled to the output of division logic circuit 110, a second data input coupled to the output of bit-shifting circuit 150A, a third data input coupled to the output of bit-shifting circuit 150B, and a fourth data input coupled to the output of bit-shifting circuit 150C. Multiplexer 160 also includes a select input coupled to control circuit 190 and an output coupled to result lines 170. Although shown as a single multiplexer in FIG. 1, device 100 may include multiple multiplexers, where each multiplexer is configured to select among a particular bit position of each quotient.

Result lines 170 are coupled to the output of multiplexer 160. Control circuit 190 may be configured to cause multiplexer 160 to output a number representing the quotient corresponding to one of input numbers 120A-120D. In some examples, result lines 170 can deliver the number outputted by multiplexer 160 to an addressing circuit for a memory access operation. Multiplexer 160 is an optional component for device 100. In some examples, the outputs of division logic circuit 110 and bit-shifting circuits 150A-150C may be coupled directly to respective sets of result lines without a multiplexer.

Figure 2:
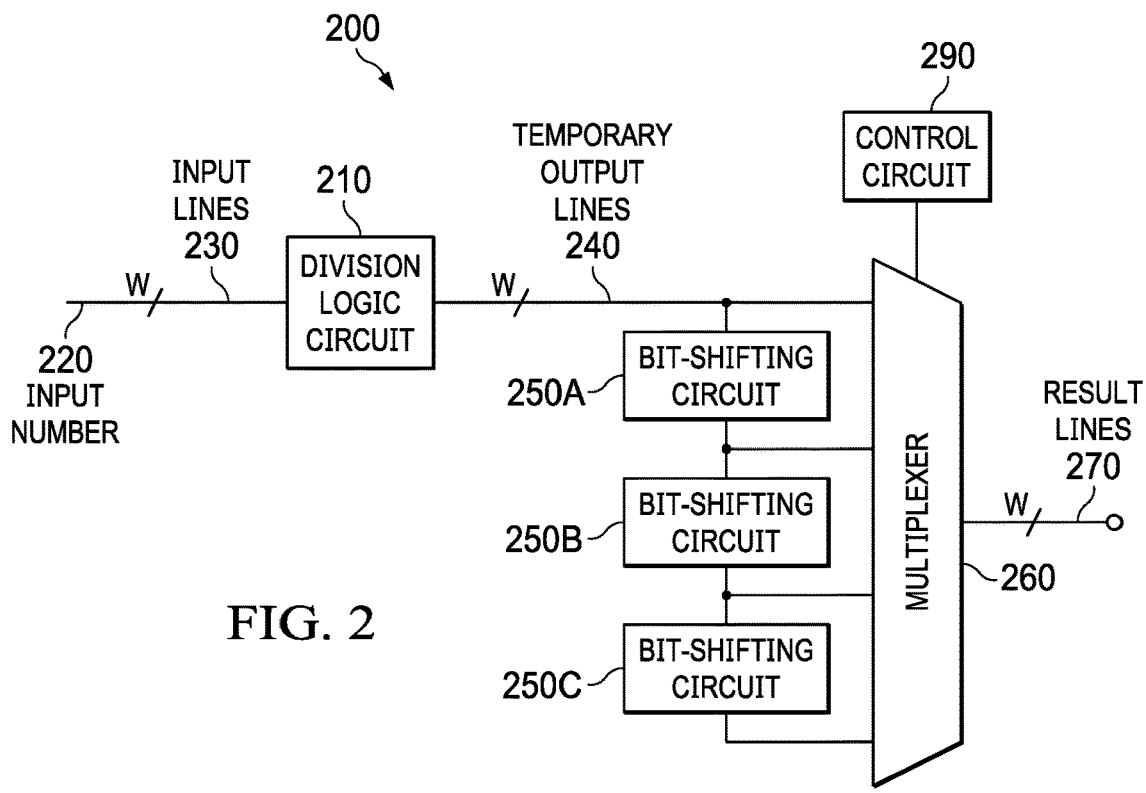

Other arrangements of bit-shifting circuits can be used for the temporary output that is generated by a division logic circuit. In that regard, FIG. 2 is a conceptual block and circuit diagram of a device 200 including a division logic circuit 210 according to some aspects of the present disclosure. In the example shown in FIG. 2, device 200 includes division logic circuit 210, input lines 230, temporary output lines 240, bit-shifting circuits 250A-250C, and result lines 270. Device 200 differs from device 100 in that bit-shifting circuits 250A-250C are connected in a string, whereas each of bit-shifting circuits 150A-150C are coupled side-by-side to the output of division logic circuit 210. Otherwise, the connections and operation of device 200 may be similar to the connections and operation of device 100, and the results outputted by devices 100 and 200 may be identical.

In the example shown in FIG. 2, bit-shifting circuit 250A is coupled to the output of division logic circuit 210, bit-shifting circuit 250B is coupled to bit-shifting circuit 250A, and bit-shifting circuit 250C is coupled to bit-shifting circuit 250B. Bit-shifting circuit 250A is coupled between division logic circuit 210 and bit-shifting circuit 250B, and bit-shifting circuit 250B is coupled between bit-shifting circuits 250A and 250C. The output of each of bit-shifting circuits 250A-250C are coupled to a respective data input of multiplexer 260. Thus, the data inputs of multiplexer 260 are configured to receive a set of numbers that are power-of-two multiples or power-of-two fractions of the other numbers in the set.

The first data input of multiplexer 260 is coupled to the output of division logic circuit 210 via temporary output lines 240. The second data input of multiplexer 260 is coupled to temporary output lines 240 via bit-shifting circuit 250A. The third data input of multiplexer 260 is coupled to temporary output lines 240 via bit-shifting circuits 250A and 250B. The fourth data input of multiplexer 260 is coupled to temporary output lines 240 via bit-shifting circuits 250A-250C. In some examples, the number at the second data input of multiplexer 260 may be one-half of the number at the first data input of multiplexer 260, the number at the third data input of multiplexer 260 may be one-fourth of the number at the first data input of multiplexer 260, and the number at the fourth data input of multiplexer 260 may be one-eighth of the number at the first data input of multiplexer 260.

Each of devices 100 and 200 include a single division logic circuit 110 and 210 that can operate on a set of input numbers, instead of a dedicated division logic circuit for each input number. Using a single division or modulo circuit can result in a smaller chip area for devices 100 and 200, as compared to other devices with a dedicated division logic circuit for each input number. The savings in chip area may be up to sixty-five percent for larger sets of input numbers. In each of devices 100 and 200, a division operation can be performed on the largest input number, and the resulting quotient can be shifted to the right to determine the quotients for the remaining input numbers. Using the largest input number allows for the resolution of all of the quotients to be maintained, whereas using the smallest input number could result in lost resolution for the larger quotients.

As an example, input number 120A-120D and/or 220 may be a part of the following set of numbers: {0xabcd, 0x1579b, 0x2af37, 0x55e6f, 0xabcde}. Division logic circuit 110 or 210 may be configured to divide the largest number 0xabcde by three to obtain the quotient 0x3944a. Multiplexer 160 or 260 will receive the numbers {0x3944, 0x7289, 0xe512, 0x1ca25, 0x39444a}, which are power-of-two fractions of the quotient 0x3944a, at the data inputs of multiplexer 160 or 260. Each of these results can be obtained by bit-shifting circuits 150A-150C or 250A-250C discarding one, two, or three of the least significant bits of the number on temporary output lines 140 or 240.

Figure 3:
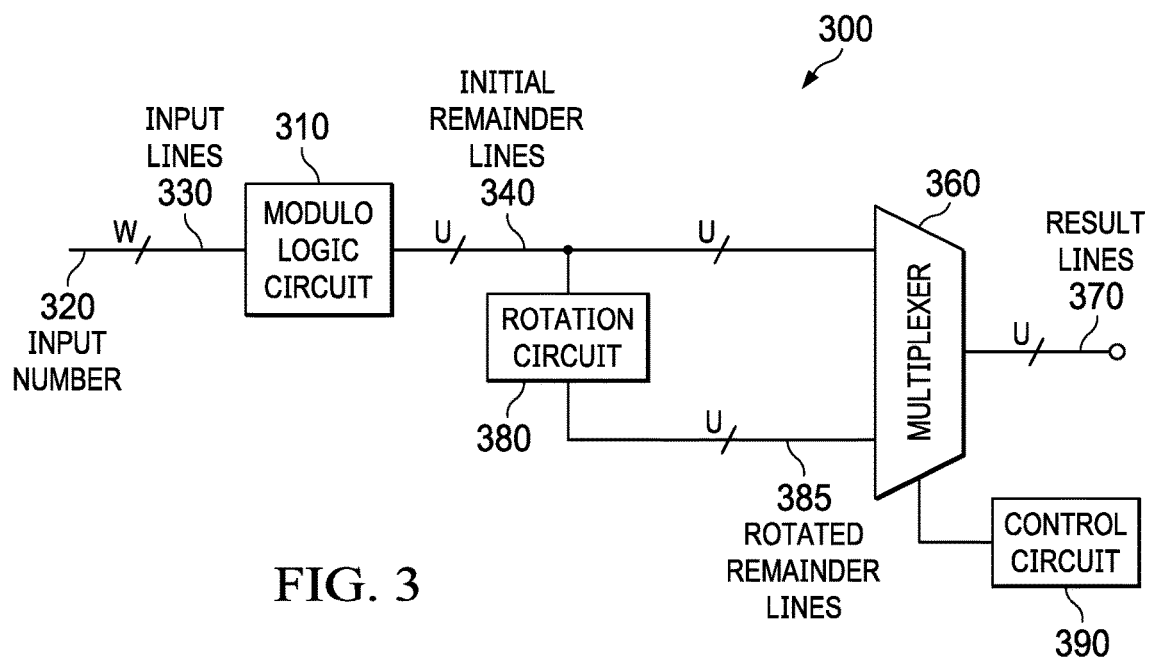
FIGS. 3, 4, and 6 are conceptual block and circuit diagrams of a device including a modulo logic circuit and a rotation circuit according to some aspects of the present disclosure.

FIGS. 1 and 2 depict circuits that can be used to perform a division operation on a set of numbers. It may be useful in some examples to perform a modulo operation on the same set of numbers. In that regard, FIG. 3 is a conceptual block and circuit diagram of a device 300 including a modulo logic circuit 310 and a rotation circuit 380 according to some aspects of the present disclosure. Device 300 may be used separately or together with a device that includes a division logic circuit, such as devices 100, 200, and 500. In examples in which the circuitry shown in FIG. 3 is used with the circuitry shown in FIG. 1 or 2, input lines 330 may be coupled to input lines 120 or 220.

Modulo logic circuit 310 includes an input coupled to input lines 330. The input of modulo logic circuit 310 is configured to receive input number 320. Modulo logic circuit 310 also includes an output coupled to initial remainder lines 340. The output of modulo logic circuit 310 is coupled to the input of rotation circuit 380 and multiplexer 360 via initial remainder lines 340. In particular, the output of modulo logic circuit 310 is coupled to the first data input of multiplexer 360 via initial remainder lines 340.

Modulo logic circuit 310 may be configured to generate an initial remainder as the result of a modulo operation based on a modulus value. Modulo logic circuit 310 can send the initial remainder to rotation circuit 380 and to a respective data input of multiplexer 360. Initial remainder lines 340 and rotated remainder lines 385 may include multiple lines for carrying the bit values for the initial remainder and the rotated remainder, but the number of lines in each of lines 340 and 385 may be less than the number of lines in input lines 330. For example, initial remainder lines 340 may include two lines for a modulo-three operation or three lines for a modulo-five operation or a modulo-seven operation.

Rotation circuit 380 includes an input coupled to the output of modulo logic circuit 310 via initial remainder lines 340. Rotation circuit 380 also includes an output coupled to a second data input of multiplexer 360 via rotated remainder lines 385. Rotation circuit 380 may be configured to multiply the initial remainder by two and output the multiplied remainder as the rotated remainder. If the multiplied remainder is greater than or equal to the modulus of modulo logic circuit 310, rotation circuit 380 may be configured to subtract the modulus from the multiplied remainder and output, as the rotated remainder, the difference between the multiplied remainder and the modulus. Rotation circuit 380 may include a look-up table or another circuit for generating the rotated remainder based on the initial remainder received from modulo logic circuit 310.

There is a specific pattern that the modulo results for multiple dividends follow when each of the dividends are power-of-two multiples or power-of-two fractions of the other dividends. For example, if modulo-three of $A \times 2^k$ equals M, and the exponent k is an even integer, then modulo-three of A equals M. If k is an odd integer, then modulo-three of A equals R(M), where R(0) equals zero, R(1) equals two, and R(2) equals one. Thus, for a modulo-three operation, the rotated remainder R(M) equals twice the initial remainder M where M equals zero or one. For a modulo-three operation, the rotated remainder R(M) equals twice the initial remainder M minus the modulus (three) where M equals two. Control circuit 390 may be configured to provide signals to the select input of multiplexer 360 based on whether the exponent k is odd or even.

Multiplexer 360 includes a first data input coupled to the output of modulo logic circuit 310 via initial remainder lines 340. Multiplexer 360 includes a second data input coupled to the output of rotation circuit 380 via rotated remainder lines 385. Multiplexer 360 includes at least one select input coupled to control circuit 390. Multiplexer 360 includes an output coupled to result lines 370.

Device 300 may include one or more additional multiplexers not shown in FIG. 3 for multiplexing between initial remainder lines 340 and rotated remainder lines 385. Adding multiplexers to device 300 allows for device 300 to output more than one result at a time. As an example, device 300 could include a second multiplexer configured to output the initial remainder in examples in which multiplexer 360 outputs the rotated remainder. The second multiplexer could include a control input coupled to control circuit 390.

As an example, input number 320 may be one number in the following set of numbers: {0xabcd, 0x1579a, 0x2af34, 0x55e68, 0xabcd0}. Modulo logic circuit 310 may be configured to compute the modulo-three remainder for the smallest number 0xacbd, which is equal to one, or for largest number 0xabcd0, which is also equal to one. Rotation circuit 380 will receive the initial remainder of one from modulo logic circuit 310 and compute the rotated remainder of two. Numbers 0x1579a and 0x55e68 are power-of-two fractions of 0xabcd0 with an odd integer k, and numbers 0xabcd and 0x2af34 are power-of-two fractions of 0xabcd0 with an even integer k. Control circuit 390 can cause multiplexer 360 to output the number (i.e., one) on initial remainder lines 340 to result lines 370. The number on initial remainder lines 340 represents the modulo result for 0xabcd0 and 0x2af34. Control circuit 390 can cause multiplexer 360 to output the number (i.e., two) on rotated remainder lines 385 to result lines 370. The number on rotated remainder lines 385 represents as the modulo result for 0x55e68 and 0x1579a.

Two more example sets of numbers that can be processed by device 300 are {0d2, 0d4, 0d8, 0d16} and {0d5, 0d10, 0d20, 0d40}. In both examples, all numbers in the set are power-of-two multiples of the smallest number. Modulo logic circuit 310 may receive one of the numbers in the set, such as the smallest number, on input lines 330. Control circuit 390 may be configured to cause multiplexer 360 to output the correct remainder for each of the numbers of the set. Multiplexer 360 can output all of the results at once, while an implementation of device 300 that includes only one multiplexer outputs a single desired result at a time.

However, in some examples, every number in a set may not be an exact power-of-two multiple of the smallest number. One example set of numbers is {0d2, 0d4, 0d8, 0d17}. In examples in which modulo logic circuit 310 receives the smallest number in this set, result lines 370 may not output the correct remainder for all of the numbers of the set because 0d17 is not an exact power-of-two multiple of the smallest number, 0d2. Devices 400 and 600 may be able to output the correct result for each number in a set, even where the largest number is not an exact power-of-two multiple of the smallest number. To accomplish this result, devices 400 and 600 use a combination of multiplexing, bit-padding, and/or mod-rotation.

Device 300 shown in FIG. 3 can be used to output the remainder for some or all of the input numbers of a set. In some examples, it may be desirable to output the quotient and/or remainder for only one input number of a set. FIGS. 1, 2 and 4-6 depict circuits that can be used for outputting the quotient or remainder for a single input number in a set of input numbers. Although the circuits shown in FIGS. 1, 2 and 4-6 are capable of outputting a single result, these circuits may also be used for outputting the results for multiple input numbers.

Figure 4:
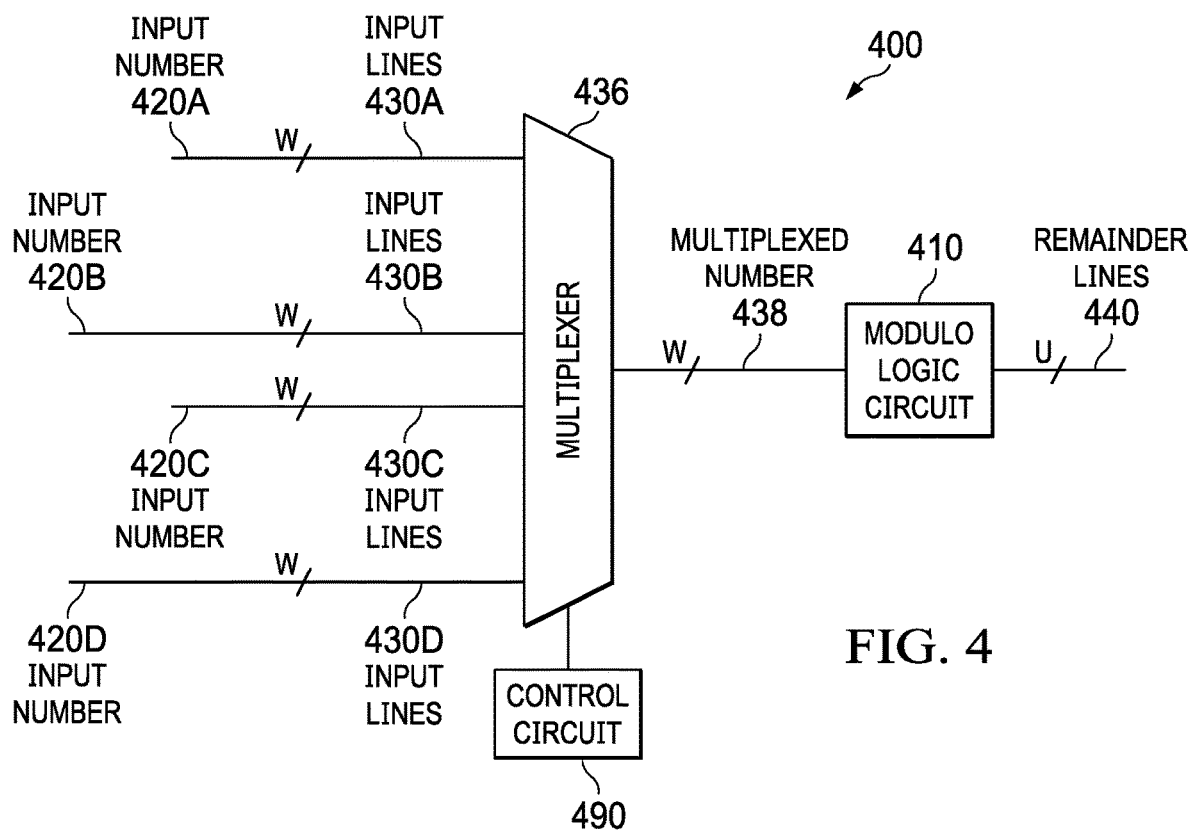

FIG. 4 is a conceptual block and circuit diagram of a device 400 including a modulo logic circuit 410 according to some aspects of the present disclosure. In the example shown in FIG. 4, device 400 includes modulo logic circuit 410, input lines 430A-430D, multiplexer 436, remainder lines 440, and control circuit 490. Device 400 may be used separately or together with a device that includes a division logic circuit, such as devices 100, 200, and 500.

Multiplexer 436 includes a plurality of data inputs, where each data input is coupled to a respective set of input lines 430A-430D. The data inputs of multiplexer 436 are configured to receive input numbers 420A-420D. Device 400 may be configured to zero-pad the most significant bits of the smaller input numbers so that all of input numbers 420A-420D have the same bit width. For example, if input number 420B is equal to one-half of input number 420A, then device 400 may add a zero to the most significant bit position of input number 420B. If input number 420C is equal to one-fourth of input number 420A, then device 400 may add two zeros to the two most significant bit positions of input number 420C.

Multiplexer 436 includes a select input coupled to control circuit 490. Multiplexer 436 includes an output coupled to the input of modulo logic circuit 410. Multiplexer 436 is configured to output one of input numbers 420A-420D as multiplexed number 438 to modulo logic circuit 410. Modulo logic circuit 410 includes an input coupled to the output of multiplexer 436. Modulo logic circuit 410 also includes an output coupled to remainder lines 440. Control circuit 490 may be configured to cause multiplexer 436 select among input numbers 420A-420D so that modulo logic circuit 410 operates on the selected input number. In order to operate on each of input numbers 420A-420D one-by-one, control circuit 490 may be configured to cause multiplexer 436 to feed input number 420A to modulo logic circuit 410. After modulo logic circuit 410 has operated on input number 420A, control circuit 490 can cause multiplexer 436 to feed input number 420B to modulo logic circuit 410, and so on.

Similar to other devices having dedicated modulo logic circuits for each input number, device 400 may be configured to compute the remainder for every one of input numbers 420A-420D. However, unlike a device with a dedicated circuit for each modulo operation, device 400 may have a smaller chip area.

Figure 5:
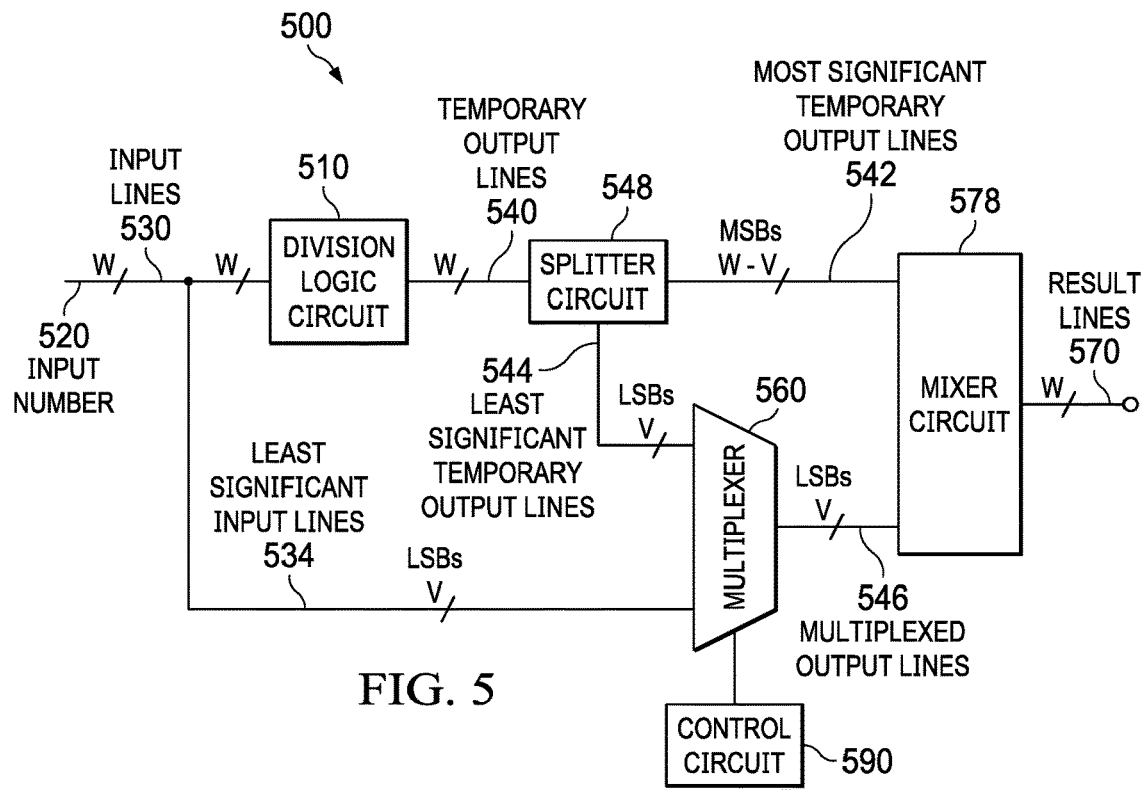

FIG. 5 is a conceptual block and circuit diagram of a device 500 including a division logic circuit 510 according to some aspects of the present disclosure. Device 500 includes division logic circuit 510, input lines 530 and 534, temporary output lines 540, 542, and 544, multiplexed output lines 546, splitter circuit 548, multiplexer 560, result lines 570, mixer circuit 578, and control circuit 590.

Division logic circuit 510 includes an input coupled to input lines 530. The input of division logic circuit 510 includes a plurality of lines, some of which (e.g., the least significant lines) are coupled to the second data input of multiplexer 560 via least significant input lines 534. Some of input lines 530 coupled to the input of division logic circuit 510 (e.g., the most significant lines) are not coupled to the second data input of multiplexer 560. Division logic circuit 510 includes an output (e.g., a plurality of lines) coupled to splitter circuit 548 via temporary output lines 540.

Splitter circuit 548 routes least significant temporary output lines 544 from the output of division logic circuit 510 to the first data input of multiplexer 560. Splitter circuit 548 routes most significant temporary output lines 542 from the output of division logic circuit 510 to mixer circuit 578. In some examples, splitter circuit 548 does not include any active circuitry but is merely a representation of how temporary output lines 540 are routed from the output of division logic circuit 510 to multiplexer 560 and to mixer circuit 578.

Multiplexer 560 includes a first data input coupled to least significant temporary output lines 544. The first data input of multiplexer 560 is coupled, via least significant temporary output lines 544 and splitter circuit 548 to the output of division logic circuit 510. Multiplexer 560 includes a second data input coupled to least significant input lines 534. The second data input of multiplexer 560 is coupled to the input of division logic circuit 510 via least significant input lines 534. Multiplexer 560 includes a select input coupled to control circuit 590. Multiplexer 560 includes an output coupled to mixer circuit 578 via multiplexed output lines 546.

To cause device 500 to calculate a quotient for a dividend that is a power-of-two fraction of input number 520, control circuit 590 may receive a k value representing the exponent value. Control circuit 590 may be configured to control multiplexer 560 based on the k value. For example, if k equals negative one, control circuit 590 will cause device 500 to output a result using one-half of input number 520 as a dividend. If k equals negative four, control circuit 590 will cause device 500 to output a result using one-sixteenth of input number 520 as a dividend. Control circuit 590 may be configured to control multiplexer 560 based on a set of k values that represent a set of dividends. The set of k values used by control circuit 590 may include contiguous values (e.g., {0, −1, −2, −3, −4}) or may not include contiguous values (e.g., {0, −1, −4, −6, −10}).

In examples in which input number 520 equals 0xabcde, division logic circuit 510 will output 0x3944a on temporary output lines 540. If control circuit 590 uses a set of k values of {0, −1, −2, −3, −4} to control multiplexer 560, the output number on result lines 570 can be represented by the following pseudocode. By replacing the least significant bits on temporary output lines 540 with bits from input number 520, the offset of the address (e.g., input number) that is not supposed to be part of the dividend can be preserved on result lines 570.

output_number[0]=(k=−1, −2, −3, −4) ? input_number[0]: temp_out_number[0];
output_number[1]=(k=−2, −3, −4) ? input_number[1]: temp_out_number[1];
output_number[2]=(k=−3, −4) ? input_number[2]: temp_out_number[2];
output_number[3]=(k=−4) ? input_number[3]: temp_out_number[3];
output_number[19:4]=temp_out_number[19:4];

For k equals negative two, the eighteen most significant bits of the output number on result lines 570 will equal be to the eighteen most significant bits of the temporary output number on temporary output lines 540, and the two least significant bits of the output number on result lines 570 will equal be to the two least significant bits of input number 520. Thus, for k equals negative two, the output number on result lines 570 will equal 0x3944a. For k equals negative three, the seventeen most significant bits of the output number on result lines 570 will equal be to the seventeen most significant bits of the temporary output number on temporary output lines 540, and the three least significant bits of the output number on result lines 570 will equal be to the three least significant bits of input number 520. Thus, for k equals negative three, the output number on result lines 570 will equal 0x3944e.

Although shown as a single multiplexer, multiplexer 560 may include a two-to-one multiplexer for each of least significant input lines 534, for each of least significant temporary output lines 544, and for each of multiplexed output lines 546 (e.g., the integer V shown in FIG. 5). By using one or more two-to-one multiplexers for multiplexer 560, device 500 may achieve a smaller chip area than other circuits that have larger multiplexers such as an N:1 multiplexer, where N is the quantity of input numbers to be processed.

Mixer circuit 578 routes most significant temporary output lines 542 from splitter circuit 548 to result lines 570. Thus, the most significant lines of result lines 570 are coupled to the output of division logic circuit 510 via some of temporary output lines 540, splitter circuit 548, most significant temporary output lines 542, and mixer circuit 578. Mixer circuit 578 also routes multiplexed output lines 546 from the output of multiplexer 560 to result lines 570. In other words, the least significant lines of result lines 570 are coupled to the output of multiplexer 560 via multiplexed output lines 546 and mixer circuit 578. In some examples, mixer circuit 578 does not include any active circuitry but is merely a representation of how lines 542 and 546 are routed to result lines 570.

Figure 6:
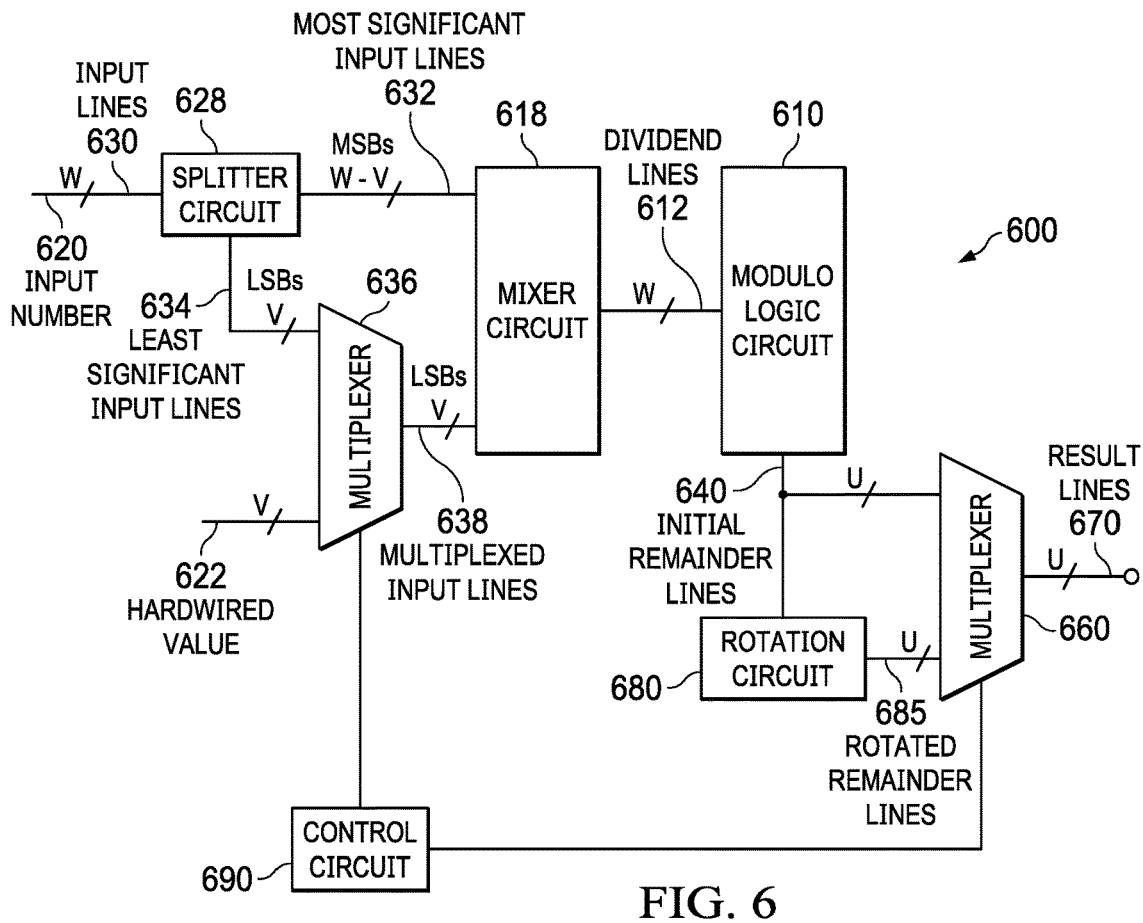

FIG. 5 depicts a circuit that can be used to perform a division operation on a single input number 520. It may be useful in some examples to perform a modulo operation on the same input number 520. In that regard, FIG. 6 is a conceptual block and circuit diagram of a device 600 including a modulo logic circuit 610 and a rotation circuit 680 according to some aspects of the present disclosure. Device 600 may be used separately or together with a device that includes a division logic circuit, such as devices 100, 200, and 500. In examples in which the circuits shown in FIGS. 5 and 6 are used together, input lines 620 may be coupled to input lines 520 so that both of logic circuits 510 and 610 receive the same input number.

Modulo logic circuit 610 includes an input coupled to dividend lines 612. Some of the lines of the input of modulo logic circuit 610 are coupled to most significant input lines 632 via mixer circuit 618 and dividend lines 612. These lines of the input of modulo logic circuit 610 are coupled to some of input lines 630 via splitter circuit 628, most significant input lines 632, mixer circuit 618, and dividend lines 612. Other lines of the input of modulo logic circuit 610 are coupled to an output of multiplexer 636 via multiplexed input lines 638, mixer circuit 618, and dividend lines 612. Most significant input lines 632 are configured to receive at least some of the bits of input number 620 via splitter circuit 628. The other bits of input number 620 are routed to a data input of multiplexer 636 via least significant input lines 634. In some examples, splitter circuit 628 does not include any active circuitry but is merely a representation of how input lines 630 are routed to mixer circuit 618 and to the data input of multiplexer 636 via input lines 632 and 634. In some examples, mixer circuit 618 does not include any active circuitry but is merely a representation of how lines 632 and 638 are routed to the input of modulo logic circuit 610 via dividend lines 612.

Modulo logic circuit 610 also includes an output coupled to initial remainder lines 640. The output of modulo logic circuit 610 is coupled to the input of rotation circuit 680 and to a data input of multiplexer 660 via initial remainder lines 640. Modulo logic circuit 610 may be configured to generate an initial remainder as the result of a modulo operation based on a modulus value (e.g., a divisor integer). Modulo logic circuit 610 can send the initial remainder to rotation circuit 680 and to the first data input of multiplexer 660. Initial remainder lines 640 and rotated remainder lines 685 may include multiple lines, but the number of lines in each of lines 640 and 685 may be less than the number of lines in input lines 630. For example, initial remainder lines 640 may include two lines for a modulo-three operation or three lines for a modulo-five operation or a modulo-seven operation, whereas input lines 620 may include sixteen, twenty, thirty-two, or any other number of lines.

Multiplexer 636 includes a first data input coupled to least significant input lines 634. The first data input of multiplexer 636 is coupled to some of input lines 630 via splitter circuit 628 and least significant input lines 634. Multiplexer 636 also includes a second data input coupled to hardwired value 622. Multiplexer 636 includes a select input coupled to control circuit 690. Multiplexer 636 includes an output coupled to multiplexed input lines 638. Although shown as a single multiplexer, multiplexer 636 may include a two-to-one multiplexer for each least significant bit of input number 620 (e.g., the integer V shown in FIG. 6). In other words, device 600 may include one multiplexer for each of least significant input lines 634 and for each of multiplexed input lines 638. By using one or more two-to-one multiplexers for multiplexer 660, device 600 may achieve a smaller chip area than other circuits that have a larger multiplexer. For example, another device may include an N:1 multiplexer, where N is the quantity of input numbers to be processed.

Although shown in FIG. 6 as a multiplexer, multiplexer 636 may function more like an AND gate with a controllable value connected to the second data input. For example, to zero-pad the first least significant bit of the input number, the first least significant bit may be AND'ed with a logical value of zero, while all of the other least significant bits of the input number may be AND'ed with a logical value of one. To zero-pad additional bits, those bits may be AND'ed with a logical value of zero, while any other least significant bits may be AND'ed with a logical value of one. By multiplexing between hardwired value 622 and the least significant bits of an input number, multiplexer 636 may be configured to zero-pad the least significant bits of an input number. In some examples, smaller input numbers in a set may have shorter bit widths than the other input numbers in the set.

Thus, multiplexer 636 may be configured to zero-pad a smaller input number by inserting zeros in the least significant bit positions. This operation may be similar to a left-shift operation followed by a right-shift operation. In some examples, input number 620 equals nine (1001) and control circuit 690 causes multiplexer 636 to substitute a zero for one least significant bit of input number 620. In such examples, a right-shift of input number 620 would yield four (0100), and a subsequent left-shift would yield eight (1000), which is equivalent to substituting one zero for the least significant bit of input number 620. Zero-padding the least significant bits allows for the number received by modulo logic circuit 610 to comply with the even-odd rotation rule described herein for modulo-three operations, so that device 600 can compute the remainder for a power-of-two fraction of input number 620 that is not an exact power-of-two fraction. Using the example above, the number four is not an exact power-of-two fraction of the number nine, but four is the result of a right-shift operation on nine. Device 600 can compute a remainder for the number four by at least zero-padding the least significant bit of the number nine (resulting in the number eight), computing the initial remainder for the number eight, and then computing the rotated remainder. In addition, the bits of input number 620 that are not zero-padded will align the number received by modulo logic circuit 610 with input number 620.

Rotation circuit 680 includes an input coupled to the output of modulo logic circuit 610 via initial remainder lines 640. Rotation circuit 680 also includes an output coupled to the second data input of multiplexer 660 via rotated remainder lines 685. Multiplexer 660 includes a first data input coupled to the output of modulo logic circuit 610 via initial remainder lines 640. Multiplexer 660 includes a second data input coupled to the output of rotation circuit 680 via rotated remainder lines 685. Multiplexer 660 includes at least one select input coupled to control circuit 690. Multiplexer 660 includes an output coupled to result lines 670.

As one example, device 600 can perform a modulo-three operation on a set of input numbers by using only a single input number (e.g., 0xabcde) and selective zero-padding of the least significant bits. With no or one bit of zero-padding, the initial remainder calculated by modulo logic circuit 610 for a dividend of 0xabcde will be zero. With two bits of zero-padding, the initial remainder calculated by modulo logic circuit 610 for a dividend of 0xabcdc will be one. With three bits of zero-padding, the initial remainder calculated by modulo logic circuit 610 for a dividend of 0xabcd8 will be zero. With four bits of zero-padding, the initial remainder calculated by modulo logic circuit 610 for a dividend of 0xabcd0 will be one. For an even number of bits of zero-padding, control circuit 690 will cause multiplexer 660 to output the initial remainder. For an odd number of bits of zero-padding, control circuit 690 will cause multiplexer 660 to output a rotated remainder.

As an example of a non-zero initial remainder with an odd number of bits of zero-padding, the initial modulo-three remainder for a dividend of 0xabc80 (i.e., seven bits of zero-padding) will be two. The rotated remainder for a modulo-three operation on 0xabc80 will be one. Control circuit 690 will cause multiplexer 660 to output the rotated remainder due to the odd number of bits of zero-padding. The rotated remainder of one outputted by multiplexer 660 is equal to modulo-three remainder for 0x1579, which is equal to 0xabcde right-shifted by seven bits (i.e., 0xabc80 divided by 0x80).

Figure 7:
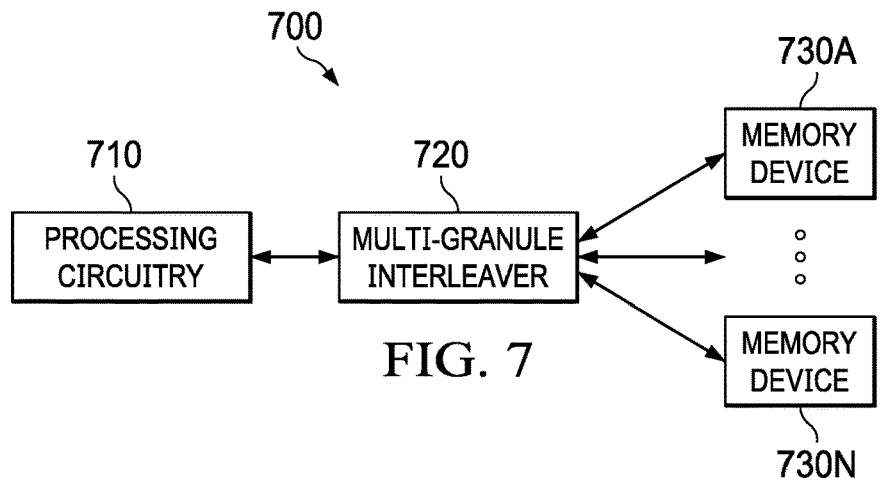
FIG. 7 is a conceptual block diagram of a system including a multi-granule interleaver according to some aspects of the present disclosure.

The devices shown in FIGS. 1-6 may be used for determining memory addresses in a system that includes a plurality of memory interfaces. In that regard, FIG. 7 is a conceptual block diagram of a system 700 including a multi-granule interleaver 720 according to some aspects of the present disclosure. In the example shown in FIG. 7, system 700 also includes processing circuitry 710 and memory devices 730A-730N.

Processing circuitry 710 may be configured to interleave a memory address space across an odd number of memory devices 730A-730N. Interleaving means that consecutive memory address locations are spread across multiple memory devices to avoid blocking one of memory devices and experiencing latency. For example, a first memory address may be located in memory device 730A, a second memory address consecutive to the first memory address may be located in memory device 730B, and a third memory address consecutive to the second memory address may be located in memory device 730C. Interleaving can reduce the latency of memory operations such as read and write operations and increase bandwidth by storing related data across multiple memory devices.

Multi-granule interleaver 720 may be configured to perform division operations and/or modulo operations as part of memory accesses. For example, multi-granule interleaver 720 can perform a division operation to determine a memory address, and multi-granule interleaver 720 can perform a modulo operation to determine which of memory devices 730A-730N to access. Using the techniques of this disclosure, multi-granule interleaver 720 may be capable of performing a single division operation and a single modulo operation to determine the address locations across multiple granules.

The number of memory devices 730A-730N may be designed into multi-granule interleaver 720 as the divisor in a division logic circuit and as the modulus in a modulo logic circuit. The number of granules in the memory space may be designed into multi-granule interleaver 720 as the quantity of input numbers fed into an input multiplexer. Multi-granule interleaver 720 may be configured to divide an incoming address by the number of memory devices 730A-730N and calculate the remainder of that division operation. The remainder of the division is used to select which of memory devices 730A-730N to access. Multi-granule interleaver 720 can use the quotient as an address in the memory access request that multi-granule interleaver 720 sends to the selected memory device.

Figure 8:
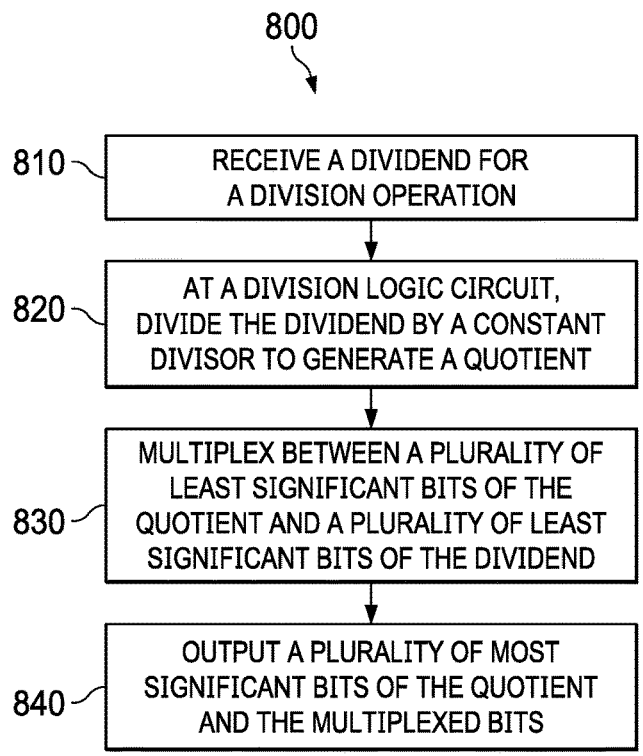
FIG. 8 is a flow diagram of a method of performing a division operation according to some aspects of the present disclosure.

FIG. 8 is a flow diagram of a method 800 of performing a division operation according to some aspects of the present disclosure. Some processes of the method 800 may be performed in orders other than described, and many processes may be performed concurrently in parallel. Furthermore, processes of the method 800 may be omitted or substituted in some examples of the present disclosure. The method 800 is described with reference to device 500 shown in FIG. 5, although other entities or components may exemplify similar techniques.

Referring to block 810, input lines 530 receives a dividend (e.g., input number 520) for a division operation. Division logic circuit 510 may receive all of the bits of input number 520, while some of the least significant bits of input number 520 may also be sent along least significant input lines 534 to a first data input of multiplexer 560. Referring to block 820, division logic circuit 510 divides input number 520 by a constant divisor to generate a quotient. Division logic circuit 510 may be a divide-by-N circuit, where N is an integer such as three, five, or seven. Division logic circuit 510 can output the quotient on temporary output lines 540. Some of the least significant bits of the quotient may be sent along least significant temporary output lines 544 via splitter circuit 548 to a second data input of multiplexer 560.

Referring to block 830, multiplexer 560 multiplexes between a plurality of least significant bits of the quotient and a plurality of least significant bits of the dividend. A first data input of multiplexer 560 receives the least significant bits of the dividend (e.g., input number 520) via least significant input lines 534. A second data input of multiplexer 560 receives the least significant bits of the quotient from the output of division logic circuit 510 via splitter circuit 548 and least significant temporary output lines 544. Based on one or more signals received at the select input of multiplexer 560 from control circuit 590, multiplexer 560 outputs the least significant bits of the quotient and/or the least significant bits of the dividend.

Referring to block 840, result lines 570 output the most significant bits of the quotient and the multiplexed bits. The bits outputted on the most significant lines of result lines 570 include the most significant bits of the result. These bits are routed from the output of division logic circuit 510 via splitter circuit 548 and mixer circuit 578 to the most significant lines of result lines 570. The bits outputted on the least significant lines of result lines 570 include the least significant bits of the result. In examples in which control circuit 590 causes multiplexer 560 to output all of the bits received on least significant temporary output lines 544, the number outputted on result lines 570 may represent the result of the division operation performed by division logic circuit 510. In examples in which control circuit 590 causes multiplexer 560 to output at least one of the bits on least significant input lines 534, the number outputted on result lines 570 may represent the result of the division operation performed by division logic circuit 510 with one or more bits of input number 520 substituted into the least significant bit positions of the result.

Figure 9:
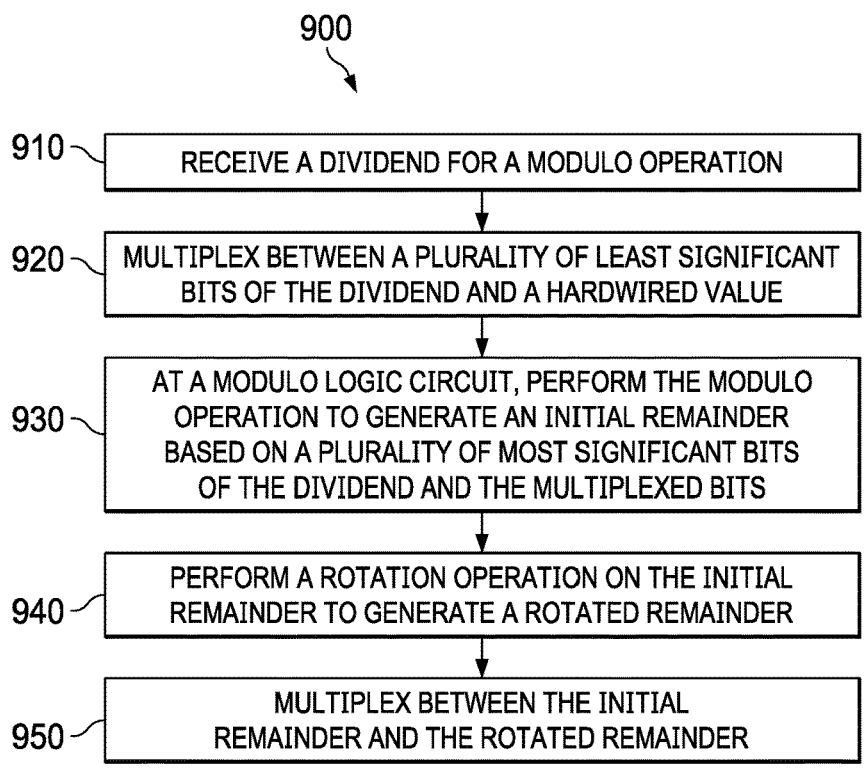
FIG. 9 is a flow diagram of a method of performing a modulo operation according to some aspects of the present disclosure.

FIG. 9 is a flow diagram of a method 900 of performing a modulo operation according to some aspects of the present disclosure. Some processes of the method 900 may be performed in orders other than described, and many processes may be performed concurrently in parallel. Furthermore, processes of the method 900 may be omitted or substituted in some examples of the present disclosure. The method 900 is described with reference to device 600 shown in FIG. 6, although other entities or components may exemplify similar techniques.

Referring to block 910, input lines 630 receive a dividend (e.g., input number 620) on input lines 630 for a modulo operation. Modulo logic circuit 610 may receive all of the bits of input number 620 via splitter circuit 628, most significant input lines 632, mixer circuit 618, and dividend lines 612, while some of the least significant bits of input number 620 may also be sent along least significant input lines 634 via splitter circuit 628 to a first data input of multiplexer 660. Referring to block 920, multiplexer 636 multiplexes between a plurality of least significant bits of input number 620 and hardwired value 622. In examples in which hardwired value 622 has a logical value of zero, multiplexer 636 may be configured to zero-pad the least significant bits of input number 620 before modulo logic circuit 610 performs a modulo operation.

Referring to block 930, modulo logic circuit 610 performs a modulo operation to generate an initial remainder based on a plurality of most significant bits of the dividend and the multiplexed bits received from multiplexer 636. Modulo logic circuit 610 may be a modulo-N circuit, where N is an integer such as three, five, or seven. Modulo logic circuit 610 receives the most significant bits of input number 620 via splitter circuit 628, most significant input lines 632, and some of dividend lines 612. Modulo logic circuit 610 also receives the multiplexed bits outputted by multiplexer 636 via multiplexed input lines 638, mixer circuit 618, and dividend lines 612, where the multiplexed bits include the least significant bits of input number 620 and/or bits having hardwired value 622. Modulo logic circuit 610 outputs the initial remainder to rotation circuit 680 and to the first data input of multiplexer 660 via initial remainder lines 640.

Referring to block 940, rotation circuit 680 performs a rotation operation on the initial remainder to generate a rotated remainder. Rotation circuit 680 receives the initial remainder from modulo logic circuit via initial remainder lines 640. Rotation circuit 680 outputs the rotated remainder to the second data input of multiplexer 660 via rotated remainder lines 685. The rotated remainder may be equal to twice the initial remainder or twice the initial remainder minus the modulus of modulo logic circuit 610. Rotation circuit 680 may include a look-up table for converting or translating the initial remainder to a rotated remainder.

Referring to block 950, multiplexer 660 multiplexes between the initial remainder and the rotated remainder. Multiplexer 660 receives the initial remainder from modulo logic circuit 610 via initial remainder lines 640. Multiplexer 660 also receives the rotated remainder from rotation circuit 680 via rotated remainder lines 685. Multiplexer 660 includes a select input that is coupled to control circuit 690 and an output coupled to result lines 670. Based on a signal received from control circuit 690, multiplexer 660 is configured to output the initial remainder or the rotated remainder to result lines 670. Control circuit 690 may be configured to cause multiplexer 660 to output the initial remainder if the desired dividend is an even power-of-two multiple of input number 620. Control circuit 690 may be configured to cause multiplexer 660 to output the rotated remainder if the desired dividend is an odd power-of-two multiple of input number 620.

Figure 10:
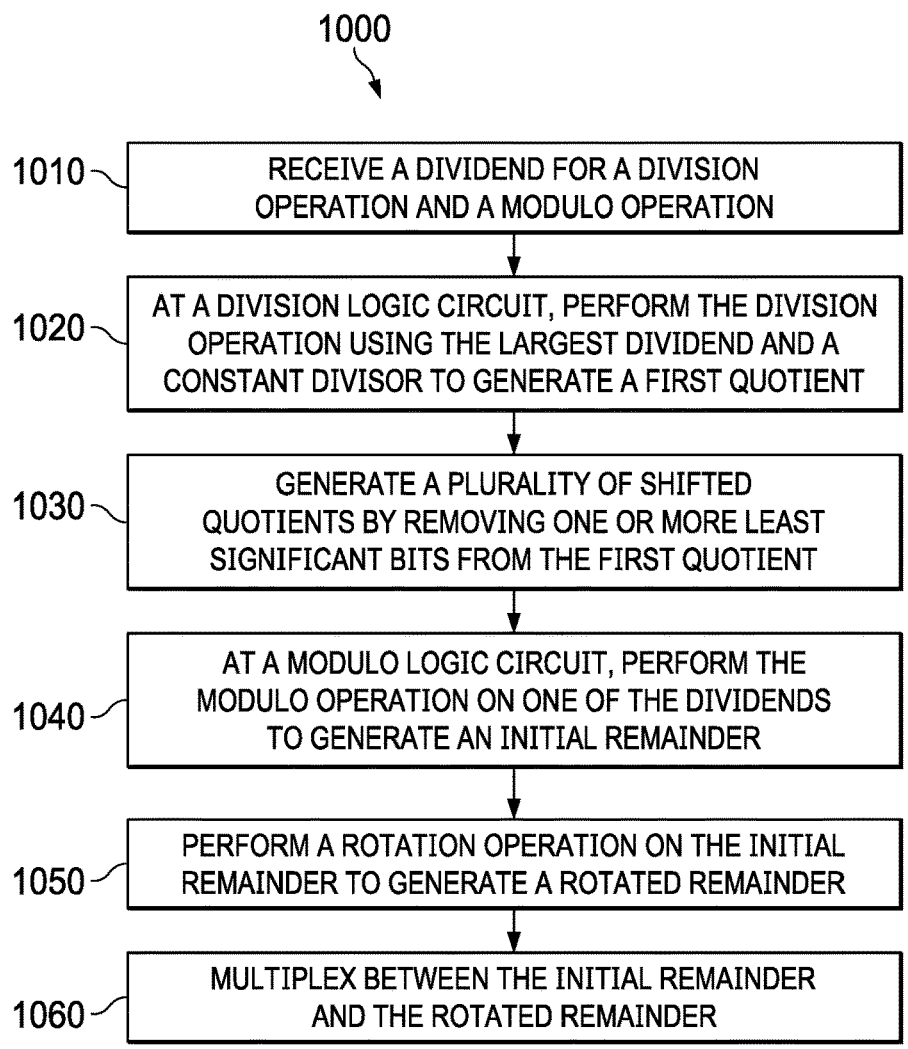
FIG. 10 is a flow diagram of a method of performing a division operation and a modulo operation according to some aspects of the present disclosure.

FIG. 10 is a flow diagram of a method 1000 of performing a division operation and a modulo operation according to some aspects of the present disclosure. Some processes of the method 1000 may be performed in orders other than described, and many processes may be performed concurrently in parallel. Furthermore, processes of the method 1000 may be omitted or substituted in some examples of the present disclosure. The method 1000 is described with reference to devices 100 and 300 shown in FIGS. 1 and 3, although other entities or components may exemplify similar techniques.

Referring to block 1010, logic circuits 110 and 310 receive input numbers 120 and 320 (e.g., dividends) for a division operation and a modulo operation. Each of input numbers 120 and 320 may be power-of-two multiples of the other numbers in a set of numbers to be processed.

Referring to block 1020, division logic circuit 110 performs the division operation using the largest dividend and a constant divisor to generate a first quotient. The constant divisor may be built into (e.g., hardwired into) the circuitry of division logic circuit 110. Division logic circuit 110 then outputs the quotient onto temporary output lines 140 to the first data input of multiplexer 160 and to bit-shifting circuits 150A-150C. Referring to block 1030, bit-shifting circuits 150A-150C generate a plurality of shifted quotients by removing one or more of the least significant bits from the first quotient. Bit-shifting circuits 150A-150C then deliver the shifted quotients to the data inputs of multiplexer 160. Based on a signal from control circuit 190, multiplexer 160 then outputs one of the quotients to result lines 170.

Referring to block 1040, modulo logic circuit 310 performs the modulo operation on one of the dividends to generate an initial remainder. Modulo logic circuit 310 then outputs the initial remainder to rotation circuit 380 and to multiplexer 360 via initial remainder lines 340. Referring to block 1050, rotation circuit 380 performs a rotation operation on the initial remainder to generate a rotated remainder. Rotation circuit 380 can compute the rotated remainder for k equals one by doubling the initial remainder and, if the doubled remainder is greater than or equal to the modulus of circuit 310, subtracting the modulus from the doubled remainder. For k equals negative one, rotation circuit 380 can set the rotated remainder equal to one-half of the initial remainder where the initial remainder is a multiple of two; otherwise, rotation 380 can set the rotated remainder equal to one-half of the sum of the initial remainder plus the modulus. Additionally or alternatively, rotated circuit 380 may include a look-up table associating each initial remainder value with a rotated remainder value. Rotation circuit 380 then outputs the rotated remainder to multiplexer 360 via rotated remainder lines 385.

Referring to block 1060, multiplexer 360 multiplexes between the initial remainder and the rotated remainder. Alternatively, device 300 may be configured to output the initial remainder on a first set of result lines and output the rotated remainder on a second set of result lines, where the initial remainder represents the remainder for even power-of-two multiples and fractions of the dividend, and where the rotated remainder represents the remainder for odd power-of-two multiples and fractions of the dividend.

The techniques of this disclosure may allow for the use of a single division logic circuit and/or a single modulo logic circuit, rather than using a dedicated division circuits and dedicated modulo circuits for each input number. This configuration can reduce the chip area and latency of circuits that perform division operations and modulo operations. In addition, the circuits described herein may be capable of generating accurate results that are identical to the results generated by larger circuits and/or slower circuits. The circuit described in this disclosure may be especially useful for multi-granule memory accesses, as described with respect to system 700 shown in FIG. 7.

The following numbered aspects demonstrate one or more aspects of the disclosure.

Aspect 1. A device includes a division logic circuit having input lines including a first least significant input line. The division logic circuit further includes temporary output lines including a second least significant line. The device also includes a first multiplexer having a first data input coupled to the first least significant input line. The first multiplexer further includes a second data input coupled to the second least significant line.

Aspect 2. The device of the preceding aspect, where the first multiplexer includes a two-to-one multiplexer.

Aspect 3. The device of the preceding aspects or any combination thereof, further including a plurality of multiplexers including the first multiplexer.

Aspect 4. The device of the preceding aspect, where each multiplexer of the plurality of multiplexers includes a two-to-one multiplexer.

Aspect 5. The device of the two preceding aspects or any combination thereof, where each multiplexer of the plurality of multiplexers includes a first data input coupled to a respective line of the input lines.

Aspect 6. The device of the three preceding aspects or any combination thereof, where each multiplexer of the plurality of multiplexers includes a second data input coupled to a respective line of the temporary output lines.

Aspect 7. The device of the preceding aspects or any combination thereof, where the input lines include least significant input lines including the first least significant input line.

Aspect 8. The device of the preceding aspect, where the first data input of each multiplexer of the plurality of multiplexers is coupled to a respective line of the least significant input lines.

Aspect 9. The device of the preceding aspects or any combination thereof, where the temporary output lines include least significant temporary output lines including the second least significant line.

Aspect 10. The device of the preceding aspect, where the second data input of each multiplexer of the plurality of multiplexers is coupled to a respective line of the least significant temporary output lines.

Aspect 11. The device of the preceding aspects or any combination thereof, further including result lines including most significant result lines and least significant result lines.

Aspect 12. The device of the preceding aspect, where the temporary output lines include most significant temporary output lines coupled to the most significant result lines.

Aspect 13. The device of the two preceding aspects or any combination thereof, where each multiplexer of the plurality of multiplexers includes an output coupled to a respective line of the least significant result lines.

Aspect 14. The device of aspect 1 or aspect 2, further including result lines including most significant result lines and a least significant result line.

Aspect 15. The device of the preceding aspect, where each line of the most significant result lines is coupled to a respective line of the temporary output lines.

Aspect 16. The device of the two preceding aspects or any combination thereof, where the first multiplexer includes an output coupled to the least significant result line.

Aspect 17. The device of the preceding aspects or any combination thereof, further including a modulo logic circuit including an input coupled to at least some of the input lines of the division logic circuit, where the modulo logic circuit further includes an output.

Aspect 18. The device of the preceding aspect, further including a rotation circuit including an input coupled to the output of the modulo logic circuit, where the rotation circuit further includes an output.

Aspect 19. The device of the two preceding aspects or any combination thereof, a second multiplexer including a first data input coupled to the output of the modulo logic circuit.

Aspect 20. The device of the preceding aspect, where the second multiplexer further includes a second data input coupled to the output of the rotation circuit.

Aspect 21. The device of the preceding aspects or any combination thereof, further including a third multiplexer including a first data input coupled to the first least significant input line.

Aspect 22. The device of the preceding aspect, where the third multiplexer further includes an output coupled to the input of the modulo logic circuit.

Aspect 23. The device of the two preceding aspects or any combination thereof, where the third multiplexer further includes a second data input.

Aspect 24. The device of the preceding aspect, further including a hardwired line coupled to the second data input of the third multiplexer.

Aspect 25. The device of the eight preceding aspects or any combination thereof, where the modulo logic circuit is configured to perform a modulo operation based on a modulus value.

Aspect 26. The device of the eight preceding aspects or any combination thereof, where the rotation circuit is configured to receive a first logical value at the input of the rotation circuit.

Aspect 27. The device of the nine preceding aspects or any combination thereof, where the rotation circuit is configured to generate a second logical value at the output of the rotation circuit.

Aspect 28. The device of the preceding aspect, where the second logical value represents twice the first logical value or twice the first logical value minus the modulus value.

Aspect 29. A device includes a first multiplexer having a first data input, a second data input, and an output. In addition, the device includes a modulo logic circuit having an input coupled to the output of the first multiplexer, where the modulo logic circuit further includes an output. The device also includes a rotation circuit including an input coupled to the output of the modulo logic circuit, where the rotation circuit further includes an output. The device further includes a second multiplexer having a first data input coupled to the output of the modulo logic circuit. The second multiplexer also includes a second data input coupled to the output of the rotation circuit.

Aspect 30. The device of the preceding aspect, further including the features of the device of aspects 1-28 or any combination thereof.

Aspect 31. The device of the two preceding aspects or any combination thereof, where the first multiplexer includes a first two-to-one multiplexer.

Aspect 32. The device of the three preceding aspects or any combination thereof, where the second multiplexer includes a second two-to-one multiplexer.

Aspect 33. The device of the four preceding aspects or any combination thereof, further including input lines including most significant input lines and a first least significant input line.

Aspect 34. The device of the preceding aspect, where the most significant input lines are coupled to the input of the modulo logic circuit.

Aspect 35. The device of the two preceding aspects or any combination thereof, where the first data input of the first multiplexer is coupled to the first least significant input line.

Aspect 36. The device of aspects 29-35 or any combination thereof, further including a plurality of multiplexers including the first multiplexer.

Aspect 37. The device of the preceding aspect, where each multiplexer of the plurality of multiplexers includes a first data input coupled to a respective line of the least significant input lines.

Aspect 38. The device of the two preceding aspects or any combination thereof, where each multiplexer of the plurality of multiplexers includes an output coupled to the input of the modulo logic circuit.

Aspect 39. The device of aspects 29-38 or any combination thereof, further including a hardwired line coupled to the second data input of the first multiplexer.

Aspect 40. The device of aspects 29-39 or any combination thereof, where the modulo logic circuit is configured to perform a modulo operation based on a modulus value.

Aspect 41. The device of aspects 29-40 or any combination thereof, where the rotation circuit is configured to receive a first logical value at the input of the rotation circuit.

Aspect 42. The device of aspects 29-41 or any combination thereof, where the rotation circuit is configured to generate a second logical value at the output of the rotation circuit.

Aspect 43. The device of the preceding aspect, where the second logical value represents twice the first logical value or twice the first logical value minus the modulus value.

Aspect 44. The device of aspects 29-43 or any combination thereof, where the rotation circuit is configured to generate a logical value of zero at the output of the rotation circuit in response to receiving the logical value of zero at the input of the rotation circuit.

Aspect 45. A device includes a division logic circuit having an input and an output. In addition, the device includes a plurality of bit-shifting circuits coupled to the output of the division logic circuit. The device also includes a modulo logic circuit having an input coupled to the input of the division logic circuit, where the modulo logic circuit further includes an output. The device further includes a rotation circuit having an input coupled to the output of the modulo logic circuit, where the rotation circuit further includes an output. The device includes a first multiplexer having a first data input coupled to the output of the modulo logic circuit. The first multiplexer further includes a second data input coupled to the output of the rotation circuit.

Aspect 46. The device of the preceding aspects, where the plurality of bit-shifting circuits includes a first bit-shifting circuit and a second bit-shifting circuit.

Aspect 47. The device of the two preceding aspects or any combination thereof, further including a second multiplexer including a first input coupled to the output of the division logic circuit.

Aspect 48. The device of the preceding aspect, where the second multiplexer further includes a second input coupled to the first bit-shifting circuit.

Aspect 49. The device of the two preceding aspects or any combination thereof, where the second multiplexer further includes a third input coupled to the second bit-shifting circuit.

This disclosure has attributed functionality to control circuits 190, 290, 390, 490, 590, and 690 and processing circuitry 710. Control circuits 190, 290, 390, 490, 590, and 690 and processing circuitry 710 may include one or more processors. Control circuits 190, 290, 390, 490, 590, and 690 and processing circuitry 710 may include any combination of integrated circuitry, discrete logic circuitry, analog circuitry, such as one or more microprocessors, microcontrollers, DSPs, application specific integrated circuits (ASICs), central processing units (CPUs), graphics processing units (GPUs), FPGAs, and/or any other processing resources.

In some examples, control circuits 190, 290, 390, 490, 590, and 690 and processing circuitry 710 may include multiple components, such as any combination of the processing resources listed above, as well as other discrete or integrated logic circuitry, and/or analog circuitry. Although this disclosure has described the conceptual blocks shown in FIGS. 1-6 as hardware implementations, the techniques described in this disclosure may be embodied or encoded in an article of manufacture including a non-transitory computer-readable storage medium, such as memory devices 730A-730N or another memory device coupled to processing circuitry 710. Thus, the conceptual blocks shown in FIGS. 1-6 may represent software in some examples, rather than hardware. Example non-transitory computer-readable storage media may include random access memory (RAM), read-only memory (ROM), programmable ROM (PROM), erasable programmable ROM (EPROM), electronically erasable programmable ROM (EEPROM), flash memory, a solid-state drive, a hard disk, magnetic media, optical media, or any other computer readable storage devices or tangible computer readable media. The term "non-transitory" may indicate that the storage medium is not embodied in a carrier wave or a propagated signal. In certain examples, a non-transitory storage medium may store data that can, over time, change (e.g., in RAM or cache).

In this description, the term "couple" may cover connections, communications, or signal paths that enable a functional relationship consistent with this description. For example, if device A generates a signal to control device B to perform an action: (a) in a first example, device A is coupled to device B by direct connection; or (b) in a second example, device A is coupled to device B through intervening component C if intervening component C does not alter the functional relationship between device A and device B, such that device B is controlled by device A via the control signal generated by device A.

It is understood that the present disclosure provides a number of exemplary embodiments and that modifications are possible to these embodiments. Such modifications are expressly within the scope of this disclosure. Furthermore, application of these teachings to other environments, applications, and/or purposes is consistent with and contemplated by the present disclosure.

What is claimed is:

1. A device comprising:
    a division logic circuit comprising:
        input lines including a first least significant input line; and
        output lines including a second least significant line;
    a first multiplexer comprising:
        a first data input coupled to the first least significant input line;
        a second data input coupled to the second least significant line; and
        a selection input adapted to be coupled to a control circuit;
    a modulo logic circuit comprising:
        an input coupled to at least some of the input lines of the division logic circuit; and
        an output;
    a rotation circuit comprising:
        an input coupled to the output of the modulo logic circuit; and
        an output; and
    a second multiplexer comprising:
        a first data input coupled to the output of the modulo logic circuit; and
        a second data input coupled to the output of the rotation circuit.

2. The device of claim 1, wherein the first multiplexer comprises a two-to-one multiplexer.

3. The device of claim 1, further comprising a plurality of multiplexers including the first multiplexer,
    wherein each multiplexer of the plurality of multiplexers includes a first data input coupled to a respective line of the input lines, and
    wherein each multiplexer of the plurality of multiplexers includes a second data input coupled to a respective line of the output lines.

4. The device of claim 3,
    wherein the input lines comprise least significant input lines including the first least significant input line, and
    wherein the first data input of each multiplexer of the plurality of multiplexers is coupled to a respective line of the least significant input lines.

5. The device of claim 3,
    wherein the output lines comprise least significant output lines including the second least significant line, and
    wherein the second data input of each multiplexer of the plurality of multiplexers is coupled to a respective line of the least significant output lines.

6. The device of claim 3, wherein each multiplexer of the plurality of multiplexers comprises a two-to-one multiplexer.

7. The device of claim 1,
    wherein the device further comprises result lines including most significant result lines and a least significant result line,
    wherein each line of the most significant result lines is coupled to a respective line of the output lines, and
    wherein the first multiplexer includes an output coupled to the least significant result line.

8. The device of claim 1, further comprising a third multiplexer comprising:
    a first data input coupled to the first least significant input line; and
    an output coupled to the input of the modulo logic circuit.

9. The device of claim 8,
    wherein the third multiplexer further comprises a second data input, and
    wherein the device further comprises a hardwired line coupled to the second data input of the third multiplexer.

10. The device of claim 1,
    wherein the modulo logic circuit is configured to perform a modulo operation based on a modulus value,
    wherein the rotation circuit is configured to receive a first logical value at the input of the rotation circuit,
    wherein the rotation circuit is configured to generate a second logical value at the output of the rotation circuit, and
    wherein the second logical value represents twice the first logical value or twice the first logical value minus the modulus value.

11. The device of claim 1 further comprising the control circuit, wherein:
    the input lines of the division logic circuit are configured to receive a largest value of a set of values as a dividend;
    the output lines of the division logic circuit are configured to provide a quotient of the largest value of the set of values; and
    the control circuit is configured to cause the first multiplexer to provide a result associated with each value of the set of values based on the quotient of the largest value of the set of values.

12. A device comprising:
a division logic circuit comprising:
  input lines including a first least significant input line; and
  output lines including a second least significant line;
a plurality of multiplexers, wherein:
  each multiplexer of the plurality of multiplexers includes a first data input coupled to a respective line of the input lines;
  each multiplexer of the plurality of multiplexers includes a second data input coupled to a respective line of the output lines; and
  the plurality of multiplexers includes a first multiplexer that includes:
    a first data input coupled to the first least significant input line;
    a second data input coupled to the second least significant line; and
    a selection input adapted to be coupled to a control circuit; and
result lines including most significant result lines and least significant result lines,
wherein the output lines of the division logic circuit further include most significant output lines coupled to the most significant result lines, and
wherein each multiplexer of the plurality of multiplexers includes an output coupled to a respective line of the least significant result lines.

13. A device comprising:
a first multiplexer comprising a first data input, a second data input, and an output;
a modulo logic circuit comprising an input coupled to the output of the first multiplexer, wherein the modulo logic circuit further comprises an output;
a rotation circuit comprising an input coupled to the output of the modulo logic circuit, wherein the rotation circuit further comprises an output; and
a second multiplexer comprising a first data input coupled to the output of the modulo logic circuit, wherein the second multiplexer further comprises a second data input coupled to the output of the rotation circuit.

14. The device of claim 13,
wherein the first multiplexer comprises a first two-to-one multiplexer, and
wherein the second multiplexer comprises a second two-to-one multiplexer.

15. The device of claim 13, further comprising input lines including most significant input lines and a first least significant input line,
wherein the most significant input lines are coupled to the input of the modulo logic circuit, and
wherein the first data input of the first multiplexer is coupled to the first least significant input line.

16. The device of claim 15, further comprising a plurality of multiplexers including the first multiplexer,
wherein the input lines comprise least significant input lines comprising the first least significant input line,
wherein each multiplexer of the plurality of multiplexers includes a first data input coupled to a respective line of the least significant input lines, and
wherein each multiplexer of the plurality of multiplexers comprises an output coupled to the input of the modulo logic circuit.

17. The device of claim 13, further comprising a hardwired line coupled to the second data input of the first multiplexer.

18. The device of claim 13,
wherein the modulo logic circuit is configured to perform a modulo operation based on a modulus value,
wherein the rotation circuit is configured to receive a first logical value at the input of the rotation circuit,
wherein the rotation circuit is configured to generate a second logical value at the output of the rotation circuit, and
wherein the second logical value represents twice the first logical value or twice the first logical value minus the modulus value.

19. A device comprising:
a division logic circuit comprising an input and an output;
a plurality of bit-shifting circuits coupled to the output of the division logic circuit;
a modulo logic circuit comprising an input coupled to the input of the division logic circuit, wherein the modulo logic circuit further comprises an output;
a rotation circuit comprising an input coupled to the output of the modulo logic circuit, wherein the rotation circuit further comprises an output; and
a first multiplexer comprising a first data input coupled to the output of the modulo logic circuit, wherein the first multiplexer further comprises a second data input coupled to the output of the rotation circuit.

20. The device of claim 19, further comprising a second multiplexer including a first input coupled to the output of the division logic circuit,
wherein the plurality of bit-shifting circuits comprises a first bit-shifting circuit and a second bit-shifting circuit,
wherein the second multiplexer further includes a second input coupled to the first bit-shifting circuit, and
wherein the second multiplexer further includes a third input coupled to the second bit-shifting circuit.

* * * * *